Nov. 15, 1949

P. R. McEACHRAN 2,487,887

VEHICULAR MIXING PLANT

Filed Dec. 22, 1945

INVENTOR.
Paul R. McEachran
BY
ATTORNEY

Nov. 15, 1949   P. R. McEACHRAN   2,487,887
VEHICULAR MIXING PLANT
Filed Dec. 22, 1945   3 Sheets-Sheet 2

INVENTOR.
Paul R. McEachran
BY
ATTORNEY

Nov. 15, 1949 P. R. McEACHRAN 2,487,887
VEHICULAR MIXING PLANT
Filed Dec. 22, 1945 3 Sheets-Sheet 3

INVENTOR.
Paul R. McEachran
BY
ATTORNEY

Patented Nov. 15, 1949

2,487,887

UNITED STATES PATENT OFFICE 2,487,887

VEHICULAR MIXING PLANT

Paul R. McEachran, Downey, Calif.

Application December 22, 1945, Serial No. 637,018

11 Claims. (Cl. 259—161)

My invention relates to mixing machines for use in mixing materials such as asphaltic concrete, road oil mixtures, cement, concrete, and the like, and more particularly relates to vehicular machines of the above-stated character adapted to be drawn or propelled along a roadway while engaged in laying or renewing the road surface.

As a preliminary step in the renewing of a road surface, the old surface is usually crushed and broken up by spiked rollers or the like, and is cleared from the road foundation by scraping machines which leave it heaped in piles or windrows from which it may conveniently be loaded into trucks for disposal or for transportation to points where it may be treated for reincorporation in the new surface. It is, of course, economical to utilize the broken surface as aggregate for the new whenever it may be suitably fragmented, cleaned, and if necessary remelted or heated. However, such re-utilization usually involves considerable transportation and loading and unloading, and is at best a dirty and dusty operation.

It is the usual requirement that the mixing of these materials be conducted over a relatively long period, to ensure thorough incorporation and tempering of the constituents, particularly in the case of re-working an old surface and also in the production of freshly-compounded mixtures. Prolonged heating of the aggregate is usually considered imperative. Such procedures are readily accomplished where permanent or semi-permanent installations are established for the purpose, but so far as I have been able to determine, prior investigators in this art have been unable to construct a truly portable or mobile mixing apparatus for this purpose, owing to the apparent difficulty of providing adequate heating and mixing periods.

In view of the above, it is a particular object of this invention to provide a vehicular mixing plant of a character which will provide for sufficiently prolonged heating and mixing cycles to enable the use of the apparatus in a progressive travelling manner, picking up materials as it travels over the road or highway, mixing and tempering such material, and discharging it in condition to be directly used in the formation of a road surface.

It is a further principal object of my invention to provide a machine adapted to being moved along the windrows of old surfacing material, or in the case of a new road or a road of new material, along windrows piled ahead of it by trucks or scrapers, and capable of picking up the material so presented and heating or drying it as may be required, dry-mixing it, wet-mixing it, and re-depositing it upon the road, in a continuous operation.

A further object of my invention is to provide a machine of the foregoing characteristics which is also adapted for use on water mixtures such as Portland cement or other concrete, or on mixtures having a binding of asphalt or road oil.

A further object of the invention is to provide a machine of the character described, which is particularly adapted for the preparation of road-oil mixtures, in which indirect heating of the oleaginous mixture is obtained without sacrifice of long mixing and tempering procedures.

Another object is to provide a mixing and heating machine which will not disgorge soot and dust upon its surroundings but will collect such solid materials and return them to the wet stage of the mixture where they may be readily absorbed and utilized.

It is also one of my objects to provide a machine of simplified and rugged construction in which the multiple continuous operations above outlined may be accomplished with a minimum of moving parts and in a structure of reasonable size, while yet providing a material travel at each stage of the operation sufficient to assure complete and satisfactory results.

Further objects and advantages of my invention will become apparent from consideration of the following detailed description in connection with the accompanying illustrations in which.

Figure 1:
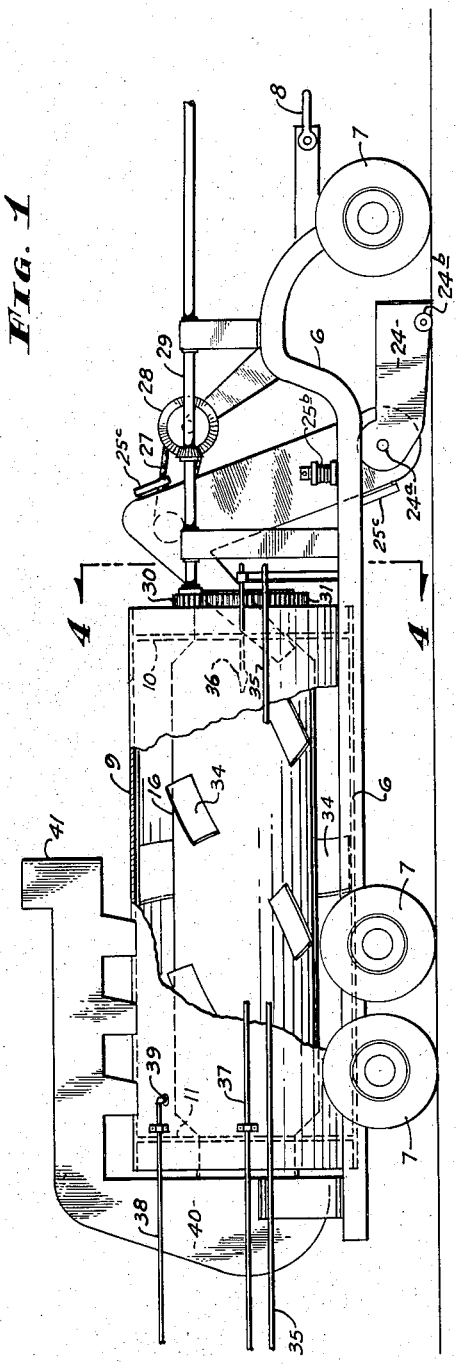
Fig. 1 is a partly broken-away side elevation of an embodiment of my invention.
Figure 2:
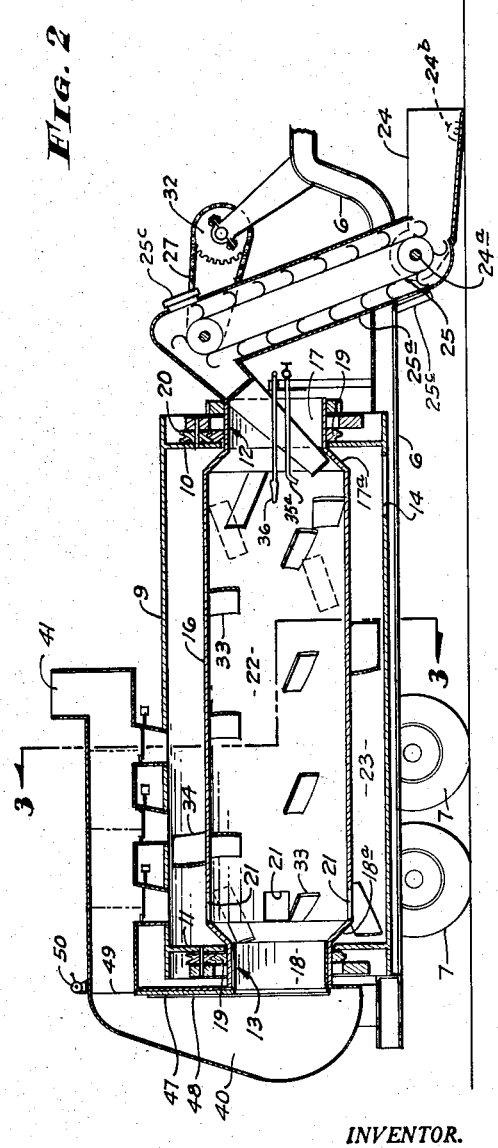
Fig. 2 is a vertical section of the machine shown in Fig. 1.
Figure 3:
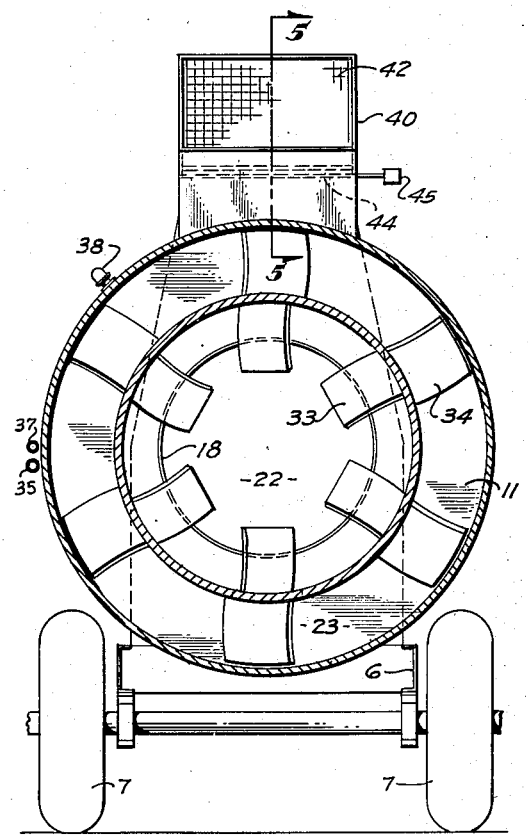
Fig. 3 is a vertical cross-section as viewed on the line 3—3 of Fig 1.
Figure 4:
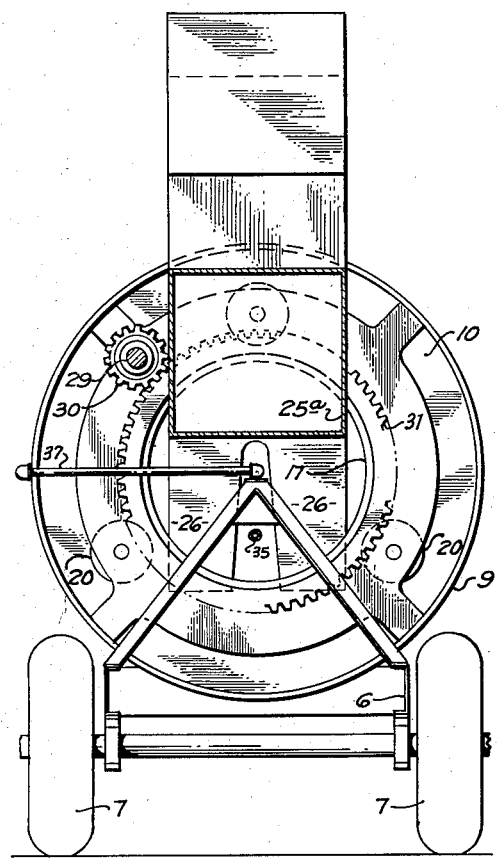
Fig. 4 is a vertical cross-section as viewed on the line 4—4 of Fig. 2.
Figures 5, 6:
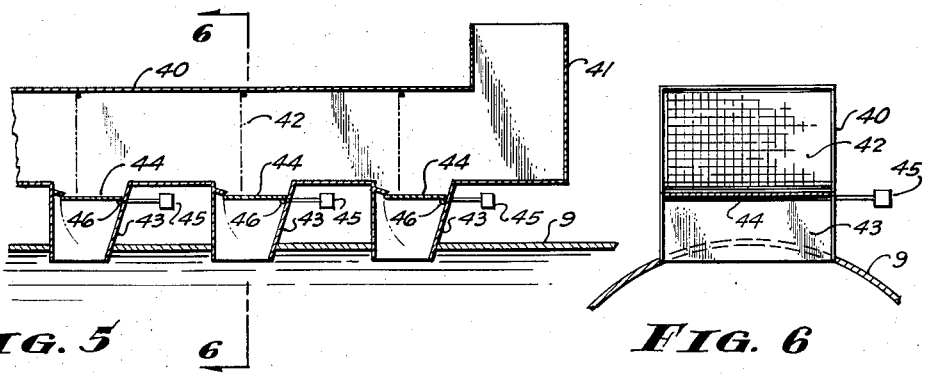
Fig. 5 is a sectional detail as taken in line 5—5 in Fig. 3.
Fig. 6 is a transverse sectional view as taken on line 6—6 in Fig. 5.

Referring now to the drawings in detail, my invention may comprise a vehicle with frame 6 and mounted on a suitable supporting structure, such as wheels 7 for example. The vehicle, as illustrated, is of trailer type, and is provided with a trailer hitch 8 at its forward end, by which it may be moved by a truck or tractor, although of course it may have a self-contained power-unit for propulsion and for driving its operating parts. The frame 6 supports a mixing tank 9, preferably of elongated cylindrical form, mounted longitudinally of the vehicle, and having forward and rearward end-walls 10 and 11 provided respectively with central openings 12 and 13. A discharge outlet 14 is provided in the lower portion of the tank 9, adjacent the forward wall 10.

An inner cylindrical drum 16 of smaller diameter than the tank 9 is rotatably mounted within the tank 9, having forward and rearward open end extensions 17 and 18 which extend through the openings 12 and 13 and are provided with annular bearing tracks 19. Bearing rollers 20, supported by the end walls 10 and 11, engage the tracks 19 and hold the drum 16 concentric with the tank 9. As will be seen later, this concentricity is only required in the lower part of the machine, and the upper part of the tank 9, above the drum 16, may be enlarged or contracted, as desired, out of cylindrical form. Adjacent the rear extension 18, the drum 16 is provided with a plurality of peripheral discharge openings 21. The respective ends of the drum 16 are preferably flared down as by transition walls 17a and 18a to the respective open extensions 17 and 18, to prevent any tendency for the discharge of material under treatment through the open ends of the drum 16. The outlet defined by the extension 18 need only be of sufficient size to provide relatively free exhaust of combustion gases as hereinafter described, and may even be closed off entirely if the use of the device were to be restricted to mixing concrete, etc., where no heating means are utilized. As an example, a damper 47 may be provided across the outlet at the extension 18, slidably mounted for vertical movement within opposed guideways 48 and provided with an operating cable 49 wound upon a hoisting drum 50 disposed externally of the flue which is adapted to receive the gases from the drum 16. The cable 49 and drum 50 have been omitted from Fig. 1.

The interior of the drum 16 provides a first mixing chamber 22 and the annular space between the drum 16 and the tank 9 provides a second mixing chamber 23, with the forward open-end extension 17, the chamber 22, the openings 21, the chamber 23 and the discharge outlet 14 forming an elongated passage for materials, reversed in direction at substantially its mid-point (at the rearward end of drum 16).

To feed materials, such as crushed road-surfacing materials, into the passage so formed, the vehicle frame 6 carries at its forward end a scoop or apron 24, adapted to engage and scoop up at its leading edge windrows of such materials (not shown) which have been laid or scraped into windrow form by hand or by other road-building machinery. The feed means also include a bucket elevator 25 that extends downwardly into the scoop 24 where it engages the materials so scooped up and lifts them to chutes 26 which deliver them to the forward open end extension 17 of the drum 16.

The bucket elevator 25 is carried in a casing 25a and may be mounted on the frame 6 through the agency of spring suspension members 25b. Inspection doors 25c are preferably provided adjacent the upper and lower ends for access to the parts which need lubrication. The scoop 24 is preferably pivotally mounted on the casing 25a, as at 24a, and may be provided at its forward end with a roller support 24b so that the forward end of the scoop may follow the road surface.

The bucket elevator 25 is connected through a chain 27 and gears 28 to a drive shaft 29 which may receive its power from any suitable source such as a power take-off on the tractor which moves the vehicle. The shaft 29 is extended rearwardly beyond the gears 28 and carries a pinion 30 which engages a gear 31 mounted on the forward extension 17 of the drum 16. This arrangement permits selectivity of the speed ratio between the rotation of the drum 16 and the feed of the elevator 25 by selection as to size of the sprockets 32 upon which the chain 27 runs. One of the sprockets 32 may advantageously be a clutch sprocket to permit cessation of operation of the elevator 25 while the machine mixes material already fed to it, if desired.

The drum 16 is provided with a plurality of internally projecting paddles or blades 33 set at an inclination or bias so as to lift the materials fed into the drum and allow them to fall rearwardly upon rotation of the drum thus mixing the materials and progressively moving the mixture rearwardly along the mixing chamber 22 toward the discharge openings 21, where it is discharged into the second mixing chamber 23. The drum 16 also carries a plurality of externally projecting paddles 34 adapted to lift and mix the materials in the chamber 23 upon rotation of the drum 16, and so inclined or biased as to move the mixture forwardly along the mixing chamber 23, or second portion of the elongated passage, toward the discharge outlet 14 where any suitable spout or conveying means may be provided for delivering the mixture to the desired location, either below, directly in line with, or to one side of, the outlet 14.

For heat treatment of the materials, a burner 36 is mounted in the forward end of the drum 16 so as to project a flame rearwardly therein into the chamber 22, fuel being supplied therefor through a pipe 37 which passes between the chutes 26 and may be connected to a fuel supply tank on the frame 6 or pump on a separate trailer or other vehicle. As the materials in the drum 16 fall constantly to the lower portion thereof, the flame from the burner 36 will directly heat that portion of the drum which is at anytime uppermost, and thus send the heat into the external paddles 34, whence it is transferred to the materials in the second mixing chamber 23. Direct transfer of heat from the heated walls of the drum 16 by radiation also takes place, compensating for heat lost by the materials during their travel along the elongated passage.

A liquid supply line 35 may be provided for introducing liquid as at 35a to the forward end of the first mixing chamber 22, and a separate supply line 38 may be provided for introducing liquid into the rearward end of the outer mixing chamber 23, as at 39.

It will be appreciated that various types of mixtures may be prepared with the apparatus of this invention. Where simple concrete or cement mixtures are to be prepared the chamber 22 may be utilized as a dry mixing chamber, water may be introduced at 39 and the chamber 23 becomes a wet mix chamber. Alternatively, both chambers may be used as wet-mix chambers. Cement-stabilized road mixtures may be handled in the same manner. In the case of asphaltic stabilized mixtures, water may be added to the mix at the forward end of chamber 22 as at 35a and the material brought to a desired wetted condition, and the desired asphaltic emulsion or the like admitted as at 39 to the chamber 23. When the burner 36 is employed, the aggregate may be heated in the chamber 22 and a desired oil or asphaltic material may then be supplied as at 39 for mixture with the heated aggregate.

Air to support combustion at the burner 36 enters the forward open extension 17 of the drum 16 and the products of combustion, as well as dust and water vapor are carried off by a flue 40 connected to the rear open extension 18. Flue 40 extends upwardly and then forwardly over the tank 9 and is provided with a short stack 41 to carry off gaseous products. To conserve solid materials and to prevent them being disgorged over the surroundings a plurality of screens 42 are provided in the horizontal portion of the flue 40. A hopper or chute 43 is provided below each of these screens, and each of these hoppers is provided with a counter-balanced gate member 44 pivotally mounted at 46, and normally blocking passage of air or gases between the tank 9 and the stack 41. When dust, soot, or other solid material accumulates on the screens 42, it falls to the gates 44, and when one of these gates accumulates a weight of material sufficient to off-set the counter-balance 45, it is tilted momentarily and delivers the accumulated material into the chamber 23. As this delivery occurs at the end of the chamber 23 nearest the liquid inlet 39, the delivered solids are rapidly incorporated into the wet mix.

The elongated passage provided by the interior zone 22 within the drum 16 and the exterior zone 23 between the tank 9 and the drum 16, which in effect is a continuous passage reversed at the rearward end of the drum 16, makes possible the prolonged mixing and heating in the zone 22 and the prolonged mixing and tempering in zone 23 (still under heat as provided by radiation from and contact with the walls of the drum 16 and the blades or paddles 33) which is required for proper preparation of road-oil and/or asphaltic mixtures.

For mixing concrete it is not necessary to maintain a flame at the burner 36. The dried ingredients are fed into the dry-mix chamber 22 and therein thoroughly mixed, and water is supplied through pipe 38 and the mixing completed in the wet-mix chamber 23. Air entrained with the incoming dry materials through the forward extension 17 will convey dust to the flue 40 whence it is returned to the wet-mix chamber 23 through the gates 44.

Figure 7:
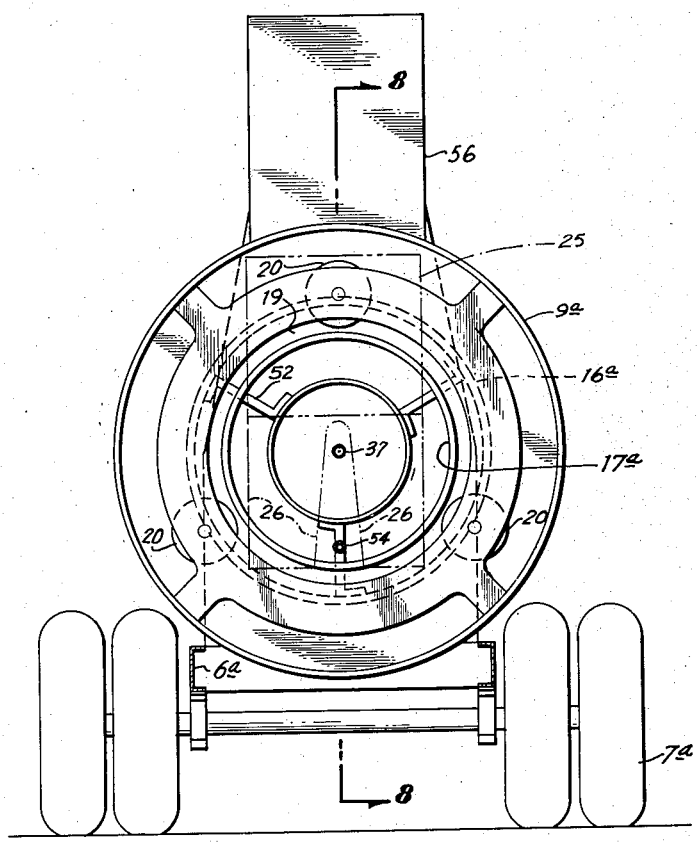
Fig. 7 is a transverse section of a modified structure according to this invention.
Figure 8:
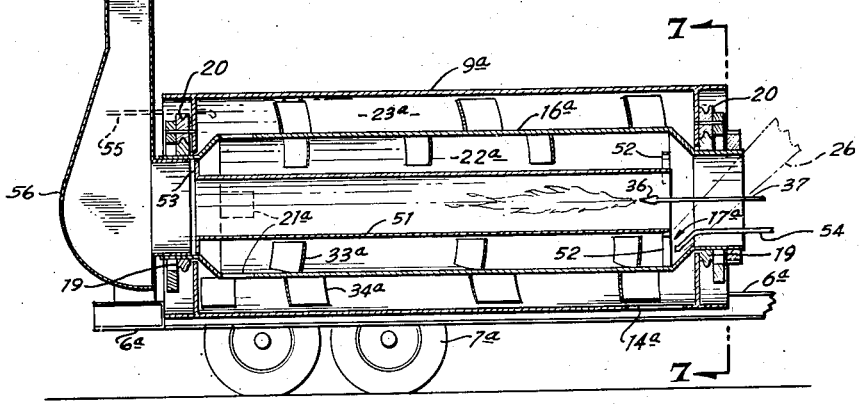
Fig. 8 is a longitudinal sectional view, as taken on line 8—8 in Fig. 7, Fig. 7 being taken as along line 7—7 in Fig. 8.

In Figs. 7 and 8 I have illustrated a modified form of the invention for use particularly in the preparation of road-oil mixtures, wherein heat is applied indirectly so that unwanted combustion of the oil is prevented. Referring to these figures a vehicle frame in indicated at 6a, provided with supporting wheels 7a and carrying an outer mixing tank 9a and an inner drum 16a supported for rotation after the manner of the first-disclosed form of the invention. Within the drum 16a I provide a fire tube 51 carried on a spider 52 at its forward end to provide an annular opening 17a for the introduction of the materials to be handled as through chutes 26. The rearward end of the tube 51 is sealed or connected to the rearward end of the drum 16a so as to provide an enclosed rearward end 53 for the mixing chamber 22a, the drum 16a being provided with discharge openings 21a and interior and exterior mixing paddles 33a and 34a corresponding to the paddles or blades 33—34 of the first form of the invention. Fluid supply means may be provided at the forward end of the chamber 22a, as at 54, and at the rearward end of chamber 23a, as at 55, for alternative or concurrent supply of liquid to the respective chambers. A stack or flue 56 is preferably provided at the rearward end of the device.

In the use of this form of device in the preparation of road-oil mixtures, heat may be supplied to the tube 51 through the agency of the burner 36 and its associated fuel supply line 37, material delivered through the chutes 26 to the forward end of the chamber 22a through the annular opening 17a, together with road-oil or the like admitted as at 54. The chamber 22a is indirectly heated from the tube 51 and the liquid and solid material supplied to the chamber 22a are intermixed during their rearward travel therethrough. Upon reaching the openings 21a the material is discharged into the outer mixing chamber 23a, where additional liquid may be supplied as at 55 if desired, the mixing continued during the forward travel of the material through the passage 23a until the discharge passage 14a in the forward end of the lower wall of the tank 9a is reached.

This particular form of the invention is also adaptable to the preparation of concrete mixtures under low temperature conditions, where a desired amount of heat may be imparted to the mixture by means of the burner 36. In such use, water may be admitted at the positions 54 and 55 alternatively, or concurrently, depending upon the type of mixture desired.

While I have herein described and have illustrated certain preferred embodiments of my invention fully capable of accomplishing the objects herein set forth, numerous modifications may be made in the various parts of the apparatus, and I do not wish to be limited to the specific details herein enumerated, the spirit and scope of my invention being best measured and determined by the appended claims.

I claim:

1. A mixing plant adapted to be moved along a roadway while engaged in laying or renewing a road surface, comprising: a vehicle; two cylinders carried longitudinally by said vehicle and concentrically one within the other, of which the inner cylinder is rotatably supported by the outer cylinder and spaced therefrom to provide an annular passage therebetween, and has a receiving opening centrally of its forward end and discharge openings adjacent its rearward end and within said outer cylinder; said outer cylinder having a discharge outlet in its lower portion adjacent its forward end; drive means for rotating said inner cylinder; and agitator means carried internally and externally by said inner cylinder for mixing said materials, said means being biased to move said materials rearwardly within said inner cylinder toward said discharge openings, and forwardly between said cylinders toward said discharge outlet of said outer cylinder.

2. A mixing plant of the character described comprising: a vehicle; a wet-mix tank of cylindrical lower portion carried longitudinally by said vehicle and defining a mixing wall; a dry-mix drum concentric within said lower portion and journaled for rotation therewithin, said drum having a receiving opening centrally of its forward end and discharge openings adjacent its rearward end and within said tank; said tank having a discharge outlet in its lower portion adjacent its forward end; means for introducing materials to be mixed into said receiving opening; drive means for rotating said drum; paddles carried internally and externally by said drum for mixing said material, said externally carried paddles being adapted to coact with said mixing wall, and said paddles being biased to move said materials rearwardly within said drum and forwardly between said drum and said tank; and a liquid inlet for introducing liquid into said tank adjacent the rearward end thereof.

3. A mixing chamber for a mixing plant adapted to be moved along a roadway while engaged in laying or renewing a road surface, comprising: two cylinders concentrically mounted, one within the other to provide a space therebetween, the inner being journaled in the end walls of the outer and having a receiving opening centrally of one end and peripheral discharge openings adjacent the other end forming a passage extending from said one end in one direction through said inner cylinder and in the opposite direction between said cylinders; means for rotating said inner cylinder; paddles carried internally and externally by said inner cylinder for mixing material and progressively moving it along said passage; and said outer cylinder defining a fixed mixing wall cooperating with the externally carried paddles for movement of material in the space between said cylinders, said mixing wall being provided with a discharge opening at the end thereof adjacent the receiving opening of said inner cylinder.

4. In a mixing plant of the character described, the combination of: mixing means forming an elongated passage; means forming part of said mixing means for moving materials along said passage; a burner mounted to project flame along the first portion of said passage; a liquid inlet for admixing liquid with said materials in the subsequent portion of said passage; a flue connected to said passage at the latter end of said first portion thereof; dust traps carried by said flue; and means actuable by the accumulation of solid matter in said traps for returning said matter to said subsequent portion of said passage.

5. A vehicular mixing plant provided with a mixing chamber construction which comprises: an elongated cylindrical drum member adapted for rotation about its longitudinal axis and provided with a material-receiving opening at one end and one or more laterally directed material-discharge openings at the other end; tank means surrounding said drum member and spaced therefrom to provide a longitudinally extending passage thereabout, the lower wall of said tank member being substantially concentric with said cylindrical drum member and provided with a material-discharge opening at the end thereof adjacent said one end of said drum member; means for rotating said drum member within said tank member; and blade elements on said drum member internally and externally thereof and rotatable therewith, said blade elements being disposed to convey material from said one end of said drum member toward the other end thereof to the position of said first-named material-discharge openings thence through the space between said drum member and said tank member in an opposite direction toward said material-discharge opening in said lower wall of said tank member.

6. A construction as set forth in claim 5, said drum member being open at its other end, and comprising in addition: heating means disposed adjacent said one end of said drum member and adapted to project heat therewithin toward said other end, and flue means at said other end of said drum member in communication with said open other end.

7. A vehicular mixing plant provided with a mixing chamber construction which comprises: an elongated drum member of circular cross-section and mounted for rotation about its longitudinal axis, said drum member being provided with an axially directed opening at each end, and with one or more laterally directed openings adjacent one end thereof; tank means surrounding said drum member and spaced therefrom in a lateral direction to provide a longitudinally extending passage thereabout, the lower wall portion of said tank member being substantially concentric with said drum member, and being provided with a material-discharge opening at the end thereof opposite said one end of said drum member; flue means mounted on said tank member and communicating with the axially directed opening at said one end of said drum member; means for rotating said drum member within said tank member; blade elements on said drum member internally thereof, said blade members being disposed to convey material longitudinally through said drum member toward said one end to the position of said laterally directed opening upon rotation of said drum member in a given direction; and blade members on said drum member exteriorly thereof disposed to convey material longitudinally through the space between said drum member and said lower wall portion of said tank member from the position of said laterally directed opening toward said material-discharge opening.

8. A construction as set forth in claim 7, and comprising in addition: burner means in said drum member adapted to direct heat longitudinally therethrough towards said one end.

9. A construction as set forth in claim 7, and comprising in addition: burner means in said drum member adapted to direct heat longitudinally therethrough towards said one end; and liquid supply means for admitting liquid to said longitudinally extending passage adjacent said one end of said drum member.

10. A vehicular mixing plant provided with a mixing chamber construction which comprises: an elongated cylindrical drum member adapted for rotation about its longitudinal axis and provided with a material-receiving opening at one end and one or more laterally directed material-discharge openings at the other end; tank means surrounding said drum member and spaced therefrom to provide a longitudinally extending passage thereabout, the lower wall of said tank member being substantially concentric with said cylindrical drum member and provided with a material-discharge opening at the end thereof adjacent said one end of said drum member; a tube member disposed concentrically within said cylindrical drum member and having an open forward end, the rearward end of said tube member being sealed to the rearward end of said drum member to close the rearward end of the latter rearwardly of said laterally-directed material-discharge openings; heating means at the forward end of said tube member; means for rotating said drum member within said tank member; and blade elements on said drum member internally and externally thereof and rotatable therewith, said blade elements being disposed to convey material from said one end of said drum member toward the other end thereof to the position of said first-named material-discharge opening thence through the space between said drum member and said tank member in an opposite direction toward said material-discharge opening in said lower wall of said tank member.

11. A vehicular mixing plant provided with a mixing chamber construction which comprises: an elongated cylindrical drum member adapted for rotation about its longitudinal axis and provided with a material-receiving opening at one end and one or more peripherally located material-discharge openings at the other end; tank means surrounding said drum member and spaced therefrom to provide a longitudinally extending passage thereabout, the lower wall of said tank member being substantially concentric with said cylindrical drum member and provided with a material-discharge opening at the end thereof adjacent said one end of said drum member; means for rotating said drum member within said tank member; and blade elements on said drum member internally and externally thereof and rotatable therewith, said blade elements being disposed to convey material from said one end of said drum member toward the other end thereof to the position of said first-named material-discharge openings thence through the space between said drum member and said tank member in an opposite direction toward said material-discharge opening in said lower wall of said tank member.

PAUL R. McEACHRAN.

REFERENCES CITED

The following references are of record in the file of this patent:

UNITED STATES PATENTS

| Number | Name | Date |
|---|---|---|
| 804,990 | Worseick | Nov. 21, 1905 |
| 1,965,881 | Clark et al. | July 10, 1934 |
| 2,072,886 | Hollis | Mar. 9, 1937 |
| 2,275,600 | Arnold | Mar. 10, 1942 |
| 2,305,938 | Turnbull | Dec. 22, 1942 |
| 2,421,345 | McConnaughay | May 27, 1947 |

FOREIGN PATENTS

| Number | Country | Date |
|---|---|---|
| 6,680 | Great Britain | Mar. 20, 1909 |
| 470,590 | Germany | Feb. 25, 1926 |
| 799,532 | France | June 15, 1936 |